Figure 1:
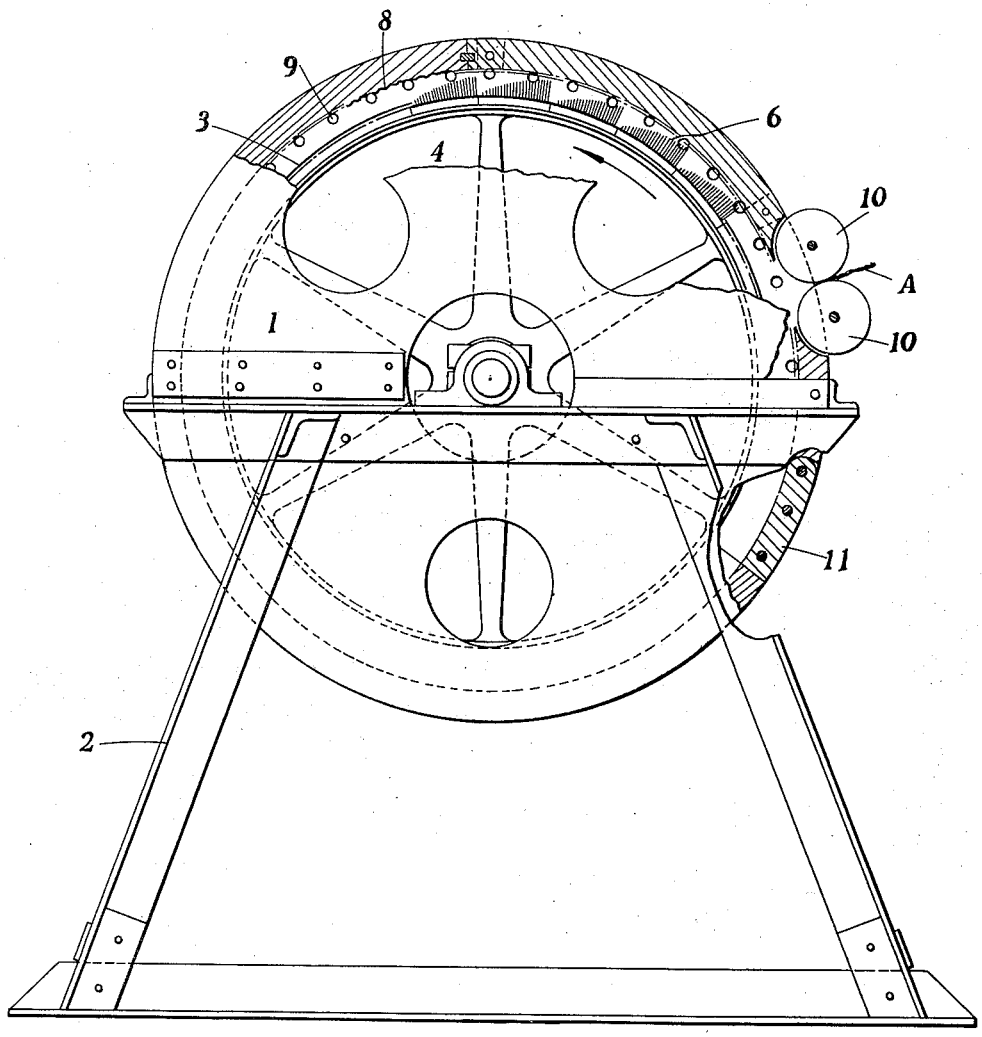

Aug. 21, 1934.   I. TUDOR ET AL   1,971,124
APPARATUS FOR TREATING FIBROUS MATERIAL
Filed Jan. 7, 1931   2 Sheets-Sheet 1

INVENTORS
I. TUDOR
O. T. HART
BY
ATTORNEY

Patented Aug. 21, 1934

UNITED STATES PATENT OFFICE 1,971,124

1,971,124

APPARATUS FOR TREATING FIBROUS MATERIAL

Ivan Tudor, New Place, Bagshot, and Owen Tudor-Hart, London, England

Application January 7, 1931, Serial No. 507,271
In Great Britain January 17, 1930

6 Claims. (Cl. 19—66)

This invention has for its object to provide a machine or apparatus for polishing and/or curling fibrous materials such as coir fibre, animal hair and the like.

In our prior specification Serial No. 402,306 we have described a process applicable to coir or like vegetable fibre which includes subjecting it to a curling or polishing process of frictional rubbing.

A suitable form of this treatment consists in taking a small quantity not exceeding, for example, half an ounce of the material and rubbing it with a rolling action between the palms of the hand, and the present invention has for its object to provide a machine whereby the operation to which the material is subjected in hand rubbing is substantially effected by mechanical rubbing.

The invention further includes a process of treating vegetable fibre, or in certain cases other fibrous material, in which small quantities of fibre are rubbed in the machine or apparatus as will hereinafter be described.

According to the invention, we provide an apparatus in which during rubbing the fibre is propelled through a space of diminishing cross-section to provide a frictional movement under increasing pressure between the fibres of the mass.

The invention further comprises a complete process of subjecting the fibres to mechanical rubbing in apparatus of the above kind.

In one preferred form of carrying the invention into effect, the apparatus comprises an outer casing or drum enclosing one or more chambers which are fairly narrow but which may have a diameter of three or four feet. The inner surface of the cylindrical periphery of each chamber, in the case of a plurality, is covered with buckskin or other suitable surfacing, the backing of this material being preferably ribbed or corrugated so as to form, as it were, internally directed smooth shallow ribs extending generally parallel to the axis of the drum.

Within each chamber is rotated a rubbing disc, and the fibre is inserted in a series of small masses between the rubbing disc and the drum wall where it is rubbed and rolled into a cylindrical or spherical ball in a manner adapted to cause the individual hairs or fibres to rub over each other with a considerable amount of friction inter se.

Preferably, this is accomplished by providing on the periphery of the drum or disc a series of spirally or tangentially shaped sections whereby a mass of fibre is subjected to increasing pressure as it passes over the sections owing to a diminution of clearance between the surfaces of the sections and that of the disc or drum.

In operation, the material is rubbed on itself in a succession of sectional operations and will tend to take the form of a slightly elongated roll prevented from over elongation in an axial direction by the side walls of the drum which may be given any desired or necessary clearance.

In order that the mass of material may from time to time be oriented instead of being rolled continuously about the same internal axis, we provide a fairly frequent series of apertures or windows in one or both side walls of the drum, and when the material reaches an aperture, its end projects therethrough, and the end wall of the aperture will arrest the projecting part of the mass of material and fold it over, as it were, so as to give the succeeding treatment a new orientation.

The material may be fed in a suitable inlet opening in the periphery of the drum and be removed from an outlet opening adjacent to the inlet opening after passing a predetermined number of times round the periphery. Obviously, a plurality of drums or casings may be provided in one apparatus, a plurality of separate discs rotated therein, the discs being coupled to a single shaft.

The invention is illustrated in the accompanying drawings in which

Figure 2:
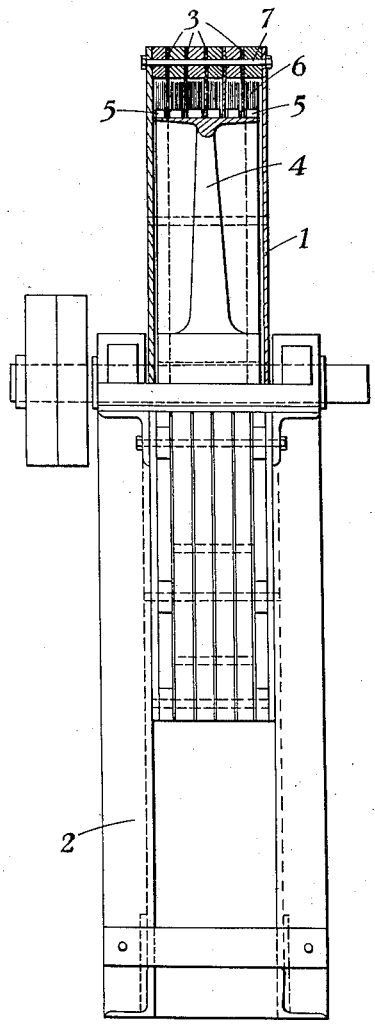

Fig. 1 represents a side view with part broken away, and Fig. 2 shows an end view with part broken away of one simple embodiment.

The form illustrated comprises a cylindrical casing 1 mounted on a suitable base 2, the casing being sub-divided by radial annular partitions 3 into a series of narrow chambers extending for a small distance inwardly of the periphery. Within the casing revolves a wheel 4 on which are mounted a plurality of disc-like rubbing members 5 carrying a circumferential series of brushes 6 the outer faces of which are cut spirally or tangentially to the circumference of wheel 4.

It will be seen from Fig. 1 that the height of the bristles extends from a position giving substantial clearance to a position in close proximity to the inner surface of the outer wall of the casing.

The outer wall of the casing is formed by a plurality of arcuate elements held together by bolts 7, the inner faces of the elements being ribbed as shown at 8, Fig. 1, and the ribbed surfaces being covered with buckskin or other suitable buffing material. The free faces of alternate partitions 3 are provided with a series of perforations 9. The periphery of the casing is cut away to accommodate a pair of feeding rollers 10 or other feed mechanism to supply material to the various chambers and hinged doors 11 are provided to each chamber to permit the material to be evacuated therefrom.

The material is fed into the chambers in masses which, in the case of coir, may be about 1 gramme in weight, and it will be realized that, assuming a counterclockwise rotation of the wheel 4 in Fig. 1, the masses of material will be caught by the brushes 6 and rubbed against the ribbed surface 8 in a continuous and repeated series of spaces of diminishing cross-section so that the individual fibres of the masses will be rolled and rubbed together under increasing pressure in a large number of successive operations. By this means the individual fibres are subjected to a continuous rolling and rubbing inter se which curls and polishes them in the manner previously described.

As the masses of fibre tend to become elongated with their axes extending more or less horizontally, one end of each mass will project through the successive perforations 9, and will be caught by the opposed edge of the perforations and be turned back so that the mass will form into a more or less spherical shape and the rubbing will be effected continuously on all its individual elements.

In the form illustrated, the width of the chambers between adjacent partitions is understood to be about ¾ inch and the drum may be rotated at a speed of 200 or 300 revolutions per minute.

Automatic means are preferably provided whereby the doors 11 are opened after, for example, 10 revolutions, whereupon the rubbed masses of fibre are delivered therethrough, a fresh supply of fibre in masses such as that illustrated at A being thereafter fed to the supply rollers 10.

In the form shown, the brushing apparatus comprises a series of similar brushes with oblique faces held in separate holders on the periphery of the wheel 4.

It will be understood that the invention is not limited to the above form, but that we might, for example, utilize a fixed drum and rotating casing, the material being fed in through a door in the periphery of the drum.

Further, the brushes may be carried by the drum and the ribs 8 by the disc; and either the brushes or the ribbed surface may be stepped to provide the pressure sections.

In the form illustrated, the drum and casing are concentric, but they may be arranged eccentrically if desired so that the clearance diminishes throughout a revolution. The pressure exerted during the rubbing movement is understood to be substantial where the clearance is small since the heat generated thereby appears to facilitate the desired purpose of polishing and/or curling. In a further modification the rubbing might be effected in a helical chamber if found convenient.

After treatment in the above apparatus, the balls of material are delivered approximately spherical having a diameter of about 1 inch and are thereafter teased out by any suitable type of upholsterer's carding machine.

The invention is primarily intended for polishing and curling vegetable fibre such as coir to give it a quality comparable to that of horsehair. Obviously the machine may be used to give a curl to fibre such as animal hair which already has a polished surface.

We claim:

1. Apparatus for polishing and rolling into balls small batches of hair-like fiber comprising an annular chamber having inner and outer circular walls, a series of brushes arranged in one of the circular walls of said chamber with the bristles set in a radial direction, said bristles being of gradually increasing length in each brush, means for feeding batches of hair-like fiber into said chamber, and means for causing said brushes to move relatively to the other circular wall of the chamber.

2. Apparatus for polishing and rolling into balls small batches of hair-like fiber comprising a chamber having one wall thereof provided with a series of protuberances and another wall facing said first-mentioned wall, means for feeding batches of fiber into the chamber, means for moving said walls relatively to each other, said movement causing a rolling action on the batches of fiber, and means for periodically turning said rolled batches about an axis transverse to the axis about which they have previously been rolling.

3. Apparatus for polishing and rolling into balls small batches of hair-like fiber comprising a chamber, means for feeding batches of fiber through said chamber, means cooperating with said feeding means to cause each of said batches to be given a rolling action as it passes along said chamber, said chamber being provided with apertures at the sides causing said rolled batches of fibers to project therethrough and cause them to be orientated.

4. Apparatus for polishing and rolling into balls small batches of hair-like fibre comprising an annular member formed to provide a fibre treating chamber, one circumferential wall of the chamber formed by the member being provided with radial partitions dividing the chamber into a plurality of narrow chambers, rollers for feeding small batches of fibre into said narrow chambers, an element rotating within the member and forming the opposite circumferential wall of the chamber, a plurality of independent friction varying brush sections carried by the rotating element and operating within the narrow chambers, means in the narrow chambers to interrupt the travel of the fibre therethrough.

5. Apparatus for polishing and rolling into balls small batches of hair-like fiber comprising an annular member formed to provide a fibre treating chamber, one circumferential wall of the chamber formed by the member being provided with radial partitions dividing the chamber into a plurality of narrow chambers, rollers for feeding small batches of fiber into said narrow chambers, an element rotating within the member and forming the opposite circumferential wall of the chamber, and a plurality of independent friction varying brush sections carried by the rotating element and operating within the narrow chambers, certain of said partitions being formed with openings to engage the ends of the fiber passing through the chamber and interrupt its normal passage.

6. Apparatus for polishing and rolling into balls small batches of hair-like fiber comprising an annular member having external and internal circumferential walls and two parallel side or radial walls, the external circumferential walls being provided with ribs and the internal circumferential walls being provided with a plurality of independent friction varying brush sections, means for introducing feeding fiber in small batches into said chamber, means for causing relative rotation between said external and internal circumferential walls, said rotation causing each batch to pass around the chamber and be rolled and brushed in its transit along the chamber, and means for varying the orientation of said small batches of fiber as they pass around the chamber.

IVAN TUDOR.
OWEN TUDOR-HART.